United States Patent Office 3,286,076
Patented Nov. 15, 1966

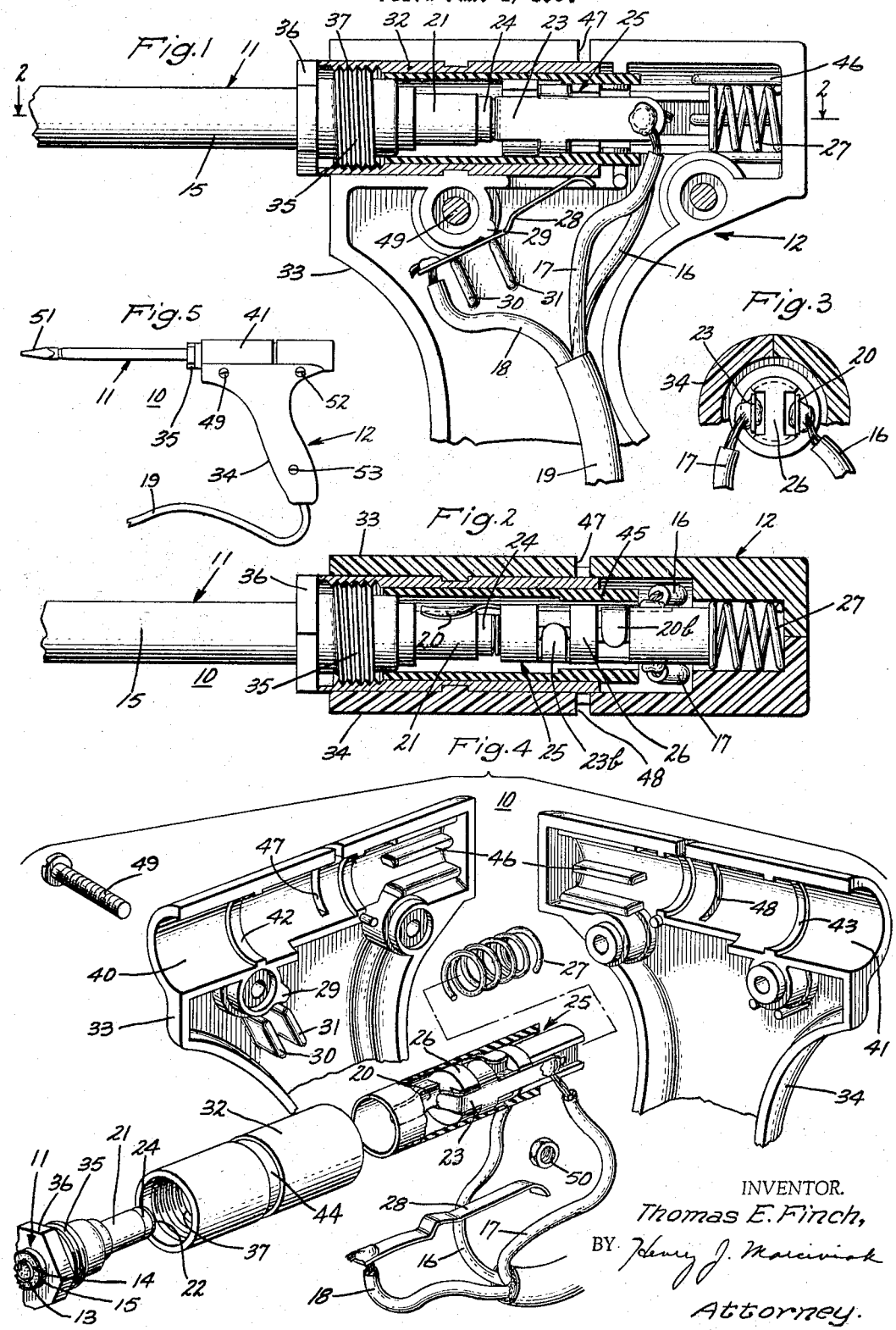
Nov. 15, 1966 — T. E. FINCH — 3,286,076
ELECTRIC HEATING DEVICE WITH ADJUSTABLE HEATING UNIT
Filed June 1, 1964
INVENTOR.
Thomas E. Finch,
BY Henry J. Marciniak
Attorney.

3,286,076
ELECTRIC HEATING DEVICE WITH ADJUSTABLE HEATING UNIT
Thomas E. Finch, Shelbyville, Ind., assignor to General Electric Company, a corporation of New York
Filed June 1, 1964, Ser. No. 371,372
8 Claims. (Cl. 219—230)

This invention relates to electrical heating devices and more particularly to electric heating devices such as soldering irons wherein the soldering tip is capable of being adjustably oriented with respect to the handle.

In a commonly used soldering iron, the working tip is formed with a flat soldering face which is brought into contact with the parts to be heated and soldered. In order that the heat from the working tip be effectively transferred to the parts to be soldered, it is necessary that the face on the working tip be brought in intimate contact with the surfaces of the parts to be joined. In a soldering iron having a straight handle, the operator can adjust the relative position of the working tip by gripping the handle so that the soldering face is properly oriented with respect to his hand and the parts to be soldered.

However, in a soldering iron with a pistol type of handle, the relative position of the soldering tip face with respect to the operator's hand is fixed. In order to properly position the face of the working tip against the surfaces to be heated, it is necessary that the operator rotate the soldering iron with a wrist movement. In some instances awkward wrist positions may be required to effect a soldering operation and subject the operator to hand fatigue. Thus, in soldering irons utilizing piston type handles it is particularly desirable that the working tip be readily adjustable to permit the face of the working tip to be properly oriented with respect to the handle and the parts to be heated so that the soldering iron can be held by the operator in a comfortable hand position.

Accordingly, it is a general object of my invention to provide a new and improved electric heating device wherein the heating element or unit can be freely turned relative to the handle to permit adjustments to be made in the orientation of the heating element with respect to the handle.

It is another object of my invention to provide an improved soldering iron with a pistol type of handle wherein the soldering tip is readily adjustable relative to the handle and the parts to be soldered.

A further object of the invention is to provide an improved soldering iron wherein the soldering tip face is readily adjustable over a full 360 degrees of rotation with respect to the handle without twisting or kinking of the electrical leads connected in electrical circuit with the heating element.

In accordance with one form of my invention, I have provided an electric heating device wherein the heating unit is adjustably rotated to 360 degrees to provide a desired orientation of the heating element with respect to the handle. The invention is exemplified in a soldering iron comprised of a sheathed heating unit with a soldering tip at one end and a pair of terminal conductors at the other end. Near the pair of terminal conductors an externally threaded portion is provided for detachably coupling the heating unit with a threaded portion formed in a hollow cylindrical metallic bushing. An electrical cable including at least two leads is provided for connecting the device in circuit with a suitable alternating power source. A connector means is also provided for detachably connecting the terminal conductors of the heating unit in circuit with two of the leads whereby when the heating unit is screwed into the bushing the leads are connected in electrical circuit with the terminal conductors and when the heating unit is uncoupled from the bushing, the terminal conductors are disconnected.

The handle of the soldering iron is preferably of the pistol type and is formed of two molded plastic sections with each of the hollow sections having a cavity adapted for conjointly gripping the metallic bushing when the sections are assembled. The bushing may be released from compressive engagement between the clamping portions by unscrewing one of the screws which retains the two sections in assembled relation or by other suitable releasing means. When the clamping portions are released, the heating unit may be rotated with the bushing to permit the soldering tip to be oriented with respect to the handle.

An advantage of the improved arrangement is that it is possible to make adjustments in the position of the soldering tip relative to the handle through a full 360 degrees of rotation. An operator performing a welding operation can readily obtain the optimum orientation of the soldering tip with respect to the parts to be soldered and with respect to the handle that best facilitates the execution of the soldering operation without causing fatigue.

The subject matter which I regard as my invention is particularly pointed out and distinctly claimed in the concluding portion of this specification. My invention, however, both as to organization and method of operation, together with further objects and advantages thereof, may be best understood by reference to the following description taken in conjunction with the accompanying drawing in which:

FIGURE 1 is a partial side elevational view partly in section showing a soldering iron embodying one form of the invention;

FIGURE 2 is a partial sectional view corresponding to the view shown in FIGURE 1 and showing the handle assembly partly in section, the sectional view being taken in part generally on lines 2—2 of FIGURE 1;

FIGURE 3 is a fragmentary sectional view showing the cable leads and their electrical connections to the connector assembly;

FIGURE 4 is a partial exploded view of the soldering iron handle assembly; and

FIGURE 5 is a reduced elevational view of a soldering iron embodying one form of the invention.

Having more specific reference now to the drawings, I have shown therein a soldering iron designated generally by the numeral 10. The soldering iron 10 is comprised of a heating unit 11 and a handle 12 which provides an enclosure for the electrical connections of the heating unit 11. The heating unit 11 is preferably of the sheathed type with an electrical resistance wire 13 embedded within a heat refractory electrical insulating material 14, such as a compacted magnesium oxide powder. The heat refractory electrical insulating material 14 is surrounded by an outer metal sheath 15. A suitable heating unit for use in soldering heating irons is shown and described in U.S. Patent No. 2,515,781, issued July 18, 1960 and assigned to the same assignee as the present application. For a more detailed description of heating units which may be used, reference may be had to the aforementioned patent.

As is best seen in the view of FIGURE 1, soldering iron 10 is adapted for connection to an electrical power source by three insulated leads which are located within a protective outer sheath 19. Electrical lead 16 is joined to a conductive clip 20 (see FIGURE 2) made of resilient material so that it engages the cylindrical terminal conductor 21 of the heating unit 11 with a spring action. The pronged end of the clip 20 is arcuate in shape so that the cylindrical terminal conductor 21 will slide into engagement with the clip 20 when the heating unit 11 is assembled in the handle 12. It will be noted that the terminal end of the heating unit 11 includes the cylindrical conductor 21 and a central conductor 22 (see FIGURE 5). An electrical connection is established between the central conductor 22 and lead 17 when the central conductor 22 engages a second conductive clip 23. A coaxial layer of insulating material 24 is disposed around the central terminal conductor 22 to provide electrical insulation between the two terminal conductors 21 and 22.

The connector assembly 25 is comprised of an insulating member 26 and the conductive clips 20 and 23, and is biased by a coil spring 27 into engagement with the right end of the heating unit 11 so that a good electrical connection is made between the central conductor 22 and conductive clip 23. It will be noted that provision is made in the soldering iron 10 for grounding the metallic bushing 32 through lead 18. Electrical lead 18 is soldered to one end of a conductive strip 28 (see FIGURE 1) made of resilient material. The conductive strip 28 is wedged between projections 29, 30 and 31 molded in the handle 12 to provide a cantilevered type of spring engagement between the outer periphery of the bushing 32 and the other end of the conductive strip 28. Thus, the conductive strip 28 provides an electrical connection between the bushing 32 and lead 18 so that when lead 18 is connected to a suitable ground, the metallic bushing 32 is effectively connected in circuit with ground.

It will be noted that the conductive clips 20 and 23 are positioned in interfitting engagement with the insulating member 26 which is provided with suitable cutout portions for mounting the conductive clips 20, 23. The conductive clips 20 and 23 are provided with suitable arms or projections 20b and 23b which respectively engage recesses provided in the insulating member 26. Although a single arm is visible in FIGURE 2 of the drawing, it will be understood that a pair of arms are formed on each of the clips 20 and 23.

The handle 12 is formed of two separable sections 33, 34 fastened together against separation in any desired or suitable manner, such as by means of screws extending through the sections 33, 34 to hold them in assembled relation. The sections 33, 34 are preferably made of thermal insulating material and when joined together define a cylindrical chamber or cavity for receiving the metallic bushing 32. It will be noted that the sheathed heating unit or element 11 is formed with an externally threaded portion 35 for engagement with an internally threaded portion 37 within the bushing 32. A hexagonal screw head 36 is provided to limit the advance of the externally threaded portion 35 into the bushing 32.

When the screw threads formed on the threaded portions 35, 37 are right-handed, the heating unit 11 is coupled with the bushing 32 by turning the heating unit 11 in a clockwise direction as viewed from the left end of the soldering iron 10 as seen in FIGURE 1. When the terminal end of the heating unit 11 advances into the bushing 32 until the screw head 36 butts against the left end of the bushing 32, further rotational movement of the screw head 36 is resisted by the clamping action of a pair of clamping portions 40 and 41 of the handle sections 33, 34 as will hereinafter be more fully explained.

To prevent axial movement of the bushing 32 with respect to the handle sections 33, 34, ribs 42 and 43 extend inwardly into engagement with a complementary annular groove 44 formed on the bushing 32.

An insulating sleeve 45, which may be made of an insulating material such as paper, is interposed between the connector assembly 25 and the terminal end of the heating unit 11 to insulate the energized parts from the metallic bushing 32. Sufficient clearance is provided between the insulating sleeve 45 and the inner surfaces of the bushing to allow rotational movement of the bushing 32 relative to the insulating sleeve 45. As is best seen in FIGURES 1 and 4, a plurality of ribs 46 are formed in the right end of the handle sections 33, 34 to guide the right end of the insulating member 26 and position the coil spring 27.

In accordance with the improved soldering tip adjusting arrangement, the slots 47 and 48 in the handle sections 33, 34 are arranged so that the clamping portions 40, 41 are formed to compressively engage or grip the bushing 32 when the screw 49 is turned in the nut 50 to draw the handle sections 33, 34 together. The amount of compressive force applied to the bushing 32 is controlled by tightening the screw 49. When it is desired to release the metallic bushing 32 from compressive engagement with the clamping portions 40, 41, the screw 49 may be loosened to reduce the compressive force exerted by the clamping portions 40, 41.

As is shown in FIGURE 5, the soldering iron 10 is equipped with a soldering tip 51 having a tapered wedge shape. It will be understood, of course, that one of the faces on the soldering tip 51 serves as a heating surface that is generally brought in contact with the parts to be soldered. The soldering tip 51 is readily removable and replaceable in the handle 12 merely by unscrewing the threaded portion 35 of the heating unit 11 from the bushing 32. The removal of the heating unit 11 from the handle 12 breaks the electrical connections between the terminal conductors 21 and 22 and the conductive clips 20 and 23. Screwing the heating unit 11 into the handle 12 causes both electrical connections to the terminal conductors 21 and 22 to be made automatically due to the resiliency of the prong end of the conductive clip 20 and due to the action of the coil spring 27 which urges the contact end of conductive clip 23 into resilient engagement with the central terminal conductor 22.

To provide any desired orientation of the soldering tip 51 with respect to the handle 12, the operator need only loosen the screw 49 to release the bushing 32 so that it can be turned manually to the desired position. In the illustrated embodiment of the invention, the screw 49 was tightened sufficiently to permit manual adjustments to be made to orientation of the soldering tip 51 without need for loosening the screw 49.

In assembling the soldering iron 10, the connector assembly 25 is inserted into the insulating sleeve 45 through the left end and positioned therein as seen in FIGURE 4. The stripped ends of leads 16 and 17 are then soldered to the terminal ends of the conductive clips 20 and 23. The stripped end of the third lead 18 is soldered to the resilient conductive strip 28. The bushing 32 is now placed concentrically over the insulating sleeve 45, and the threaded portion 35 of the heating unit 11 may now be screwed into the bushing 32. This subassembly is placed in position in the handle section 33, and the spring 27 is inserted between the end of the insulating member 26 and the back wall of the handle section 33. The conductive strip 28 is slipped into position between the projections 29, 30 and 31 so that the free end of strip 28 engages the bushing 32. The other handle section 34 is brought into assembled relation by tightening the three screws 49, 52 and 53 (see FIGURE 5). Screw 49 is tightened to provide the degree of clamping action desired by the operator.

From the foregoing description of the structural and assembly features of the improved soldering iron embodying one form of the invention, it will be apparent that the heating unit 11 is readily adjustable to provide any desired orientation of the soldering tip through 360 degrees. This provides the advantage to an operator that he can preset the angular position of the soldering tip 51 to a preselected angle that will facilitate the execution of the particular soldering operation being carried out. In the improved arrangement, the rotation of the heating unit through 360 degrees is effected without straining or kinking the leads connected in circuit therewith. Also, it will be apparent from the foregoing description that the parts of the improved soldering iron can be efficiently and readily assembled.

While I have illustrated and described one exemplification of the invention as applied to a soldering iron, it will be apparent that it may be used for other hand held heating devices in which it is desirable to make adjustments to the orientation of the heating unit with respect to the handle. Further, it will be appreciated that many modifications may be made. Accordingly, it should be understood, therefore, that I intend to cover by the appended claims any such modifications which fall within the true spirit and scope of my invention.

What I claim as new and desire to secure by Letters Patent of the United States is:

1. An electric soldering iron comprising an electrical heating unit having a soldering tip and a terminal end with a central electrical conductor, a coaxial layer of insulating material around said central conductor and a second electrical conductor coaxially positioned around said layer of insulating material, said heating unit including an externally threaded portion near the terminal end; a metallic bushing having an internally threaded portion for engaging the threaded portion of said heating unit; a connector assembly slideably disposed with respect to said bushing, said connector assembly including a first conductive clip for making an electrical connection to the center conductor of said heating unit and a second conductive clip for making an electrical connection with the second electrical conductor of said heating unit; an insulating sleeve disposed in at least a portion of said bushing for insulating the electrical connections from the metallic bushing; spring means biasing said connector assembly into engagement with the said center conductor; electrical cable means for connecting said heating unit in circuit with an electrical power source; said cable means including at least two leads, one of said leads connected in circuit with said first conductive clip and the other connected with said second conductive clip; a pistol type handle means comprised of two sections and freely supporting said bushing for rotation through 360 degrees, said sections joined to form clamping portions compressively engaging said metallic bushing and thereby preventing rotation of said bushing; and means for releasing said metallic bushing from compressive engagement with said clamping portions to allow the soldering tip of said heating unit to be oriented with respect to said handle means by rotation of said metallic bushing relative to said handle.

2. An electric soldering iron comprising an electric heating unit having an externally threaded portion, a soldering tip at one end and a pair of terminal conductors at the other end; a metallic hollow cylindrical bushing having an internally threaded portion engaging the externally threaded portion of said heating unit; a first one of said pair of terminal conductors being centrally disposed within the bushing and the second one of said pair of terminal conductors presenting a conductive area within the bushing and spaced outwardly from said first conductor; an electrical cable for supplying power to said heating unit and including at least two leads; connector means slideably disposed with respect to said bushing for detachably connecting said terminal conductors of said heating unit in electrical circuit with said leads, said connector means including a first conductive means for making an electrical connection with one of said pair of terminal conductors and a second conductive means for making an electrical connection with the other of said pair of terminal conductors; means for insulating said connector means from said metallic bushing; a pistol type handle comprised of a pair of molded plastic sections freely supporting sid bushing for rotation through 360 degrees, said sections forming clamping portions for compressively engaging the bushing and thereby preventing rotation of the bushing; and means for controlling the compressive engagement of said bushing to permit said heating unit and said bushing to be adjustably rotated through 360 degrees to provide a desired orientation of the soldering tip relative to the handle.

3. An electric heating device comprising an electric heating unit having an externally threaded portion, a heating element at one end, a pair of terminal conductors at the other end; a metallic bushing having an internally threaded portion engaging the externally threaded portion of said heating unit; a first one of said pair of terminal conductors being centrally disposed within the bushing and the second one of said pair of terminal conductors presenting a conductive area within the bushing and spaced outwardly from said first conductor; electrical cable means for connection with an alternating power source and including at least two leads; connector means slideably disposed with respect to said bushing for detachably connecting said terminal conductors of said heating unit in electrical circuit with said leads, said connector means including a first conductive means for making an electrical connection with one of said pair of terminal conductors and a second conductive means for making an electrical connection with the other of said pair of terminal conductors, said terminal conductors of the heating unit being disconnected from said leads when the externally threaded portion of the heating unit is disengaged from the internally threaded portion of the bushing; means for insulating said connector means from said metallic bushing; a pistol type handle comprised of a pair of handle sections freely supporting said bushing for rotation through 360 degrees, said handle sections including clamping portions for compressively engaging said bushing and thereby preventing rotation of said bushing; and means for controlling the compressive engagement of said bushing by said clamping portions to allow said heating unit and said bushing to be adjustably rotatable relative to said handle thereby to permit the heating element of the heating unit to be oriented with respect to said handle.

4. An electric soldering iron comprising an electric heating unit having a soldering tip at one end and a pair of terminal conductors at the other end and an externally threaded portion near said pair of terminals; an electrical cable for connection to a power supply and including at least two leads; a hollow metallic cylindrical bushing having an internally threaded portion engaging the threaded portion of said heating unit; a first one of said pair of terminal conductors being centrally disposed within the bushing and the second one of said pair of terminal conductors presenting a conductive area within the bushing and spaced outwardly from said first conductor; a screw head formed on said heating unit adjacent to said externally threaded portion and limiting the advance of said externally threaded portion into the internally threaded portion formed in said bushing; connector means slideably disposed with respect to said bushing for connecting said terminal conductors of said heating unit in electrical circuit with two of said leads when said screw head abuts against the end of said bushing and disconnecting said terminal conductors when said externally threaded portion is disengaged from the internally threaded portion of the bushing, said connector means including a first conductive means for making an electrical connection with one of said pair of terminal conductors and a second conductive means for making an electrical connection with the other of said pair of terminal conductors; a pistol type handle comprised of a pair of sections freely supporting said bushing for rotation through 360 degrees, said sections including clamping portions for compressively engaging the bushing and thereby preventing rotation of the bushing; and means for adjusting the compressive engagement of said clamping portions with the bushing to allow said bushing to rotate with the heating unit when the advance of the screw head of the heating unit is stopped by the end of the bushing and is further rotated in a direction that would cause the externally threaded portion to advance into said bushing, this further rotation of the heating unit thereby causing the bushing to rotate therewith to allow the soldering tip to be oriented with respect to the handle means.

5. The electric soldering iron set forth in claim 4 wherein said electrical cable includes three leads and a resilient contact strip is supported by one of said handle sections to hold one end of said strip in electrical engagement with the outer periphery of said bushing, the other end thereof being connected with the third electrical lead of said cable means.

6. An electric soldering iron comprising a sheathed, electrical heating unit having a soldering tip at one end and a pair of terminal conductors at the other end, a hollow bushing, said pair of terminal conductors being disposed within said bushing, a first one of said pair of terminal conductors being centrally located within the bushing and the second of said pair of terminal conductors presenting a conductive area spaced outwardly from said first conductor, means detachably connecting said heating unit with said cylindrical bushing, an electrical cable for connection to a power source and having at least two leads, connector means slideably disposed with respect to said bushing extending into said hollow bushing for connecting said terminal conductors in electrical circuit with two of said leads said connector means including a pair of conductive clips making electrical connections with respective ones of said terminal conductors, a handle comprised of a pair of sections freely supporting said bushing for rotation through 360 degrees, each of said sections having a cavity formed therein for conjointly compressively gripping said bushing and thereby preventing rotation of said bushing, and means for releasing said bushing for rotation relative to said handle thereby to allow the heating unit and said bushing to be adjustably rotated through 360 degrees to provide a desired orientation of the soldering tip with respect to the handle.

7. The soldering iron set forth in claim 6 wherein a circumferentially extending rib is formed within the cavity formed in each of said handle sections and a complementary groove is formed on the outer periphery of the bushing, said circumferentially extending groove restraining axial movement of said bushing with respect to said handle but allowing rotational movement relative thereto.

8. An electric heating device comprising a sheathed electrical heating unit having a heating portion at one end and a pair of terminal conductors at the other end; a hollow metallic bushing; said pair of terminal conductors extending into said hollow metallic bushing, a first one of said pair of terminal conductors being centrally disposed within the bushing and the second one of said pair of terminal conductors presenting a conductive area within the bushing and spaced outwardly from said first conductor; means detachably coupling said sheathed heating unit with said metallic hollow bushing; an electrical cable for connection with an electrical power source and including at least two leads; a connector assembly slideably disposed with respect to said bushing connecting said terminal conductors in an electrical circuit with two leads of said cable when said heating unit is coupled with said bushing and causing said leads to be electrically disconnected from said two leads when said heating unit is uncoupled from said bushing; said connector assembly including a pair of conductive means making electrical connections with respective ones of said terminal conductors; spring means biasing said connector assembly into engagement with the centrally disposed terminal conductor; a hollow handle freely supporting the bushing for 360 degree rotation and said hollow handle including means for restraining axial movement of said bushing with respect to said handle and including a means for gripping said bushing and thereby preventing rotation of said bushing relative to the handle; and a means for releasing said bushing to permit said heating unit and said bushing to be adjustably rotated through 360 degrees to provide a desired orientation of the heating portion of said heating unit with respect to the handle.

References Cited by the Examiner
UNITED STATES PATENTS

| | | | |
|---|---|---|---|
| 929,473 | 7/1909 | Nilsson et al. | 219—236 |
| 1,043,963 | 11/1912 | Nilsson | 219—236 |
| 1,993,781 | 3/1935 | Hampton et al. | 228—55 X |
| 2,515,781 | 7/1950 | Lennox | 219—237 X |
| 3,023,295 | 2/1962 | Johnson | 219—230 |

FOREIGN PATENTS 558,366   1/1944   Great Britain.

ANTHONY BARTIS, *Primary Examiner.*